US011053674B2

(12) United States Patent
Dian

(10) Patent No.: US 11,053,674 B2
(45) Date of Patent: Jul. 6, 2021

(54) TRENCH DRAIN CONNECTION INTERFACE

(71) Applicant: Zurn Industries, LLC, Milwaukee, WI (US)

(72) Inventor: Ludovit Dian, Mississauga (CA)

(73) Assignee: ZURN INDUSTRIES, LLC, Milwaukee, WI (US)

( * ) Notice: Subject to any disclaimer, the term of this patent is extended or adjusted under 35 U.S.C. 154(b) by 348 days.

(21) Appl. No.: 15/879,102

(22) Filed: Jan. 24, 2018

(65) Prior Publication Data
US 2018/0209131 A1 Jul. 26, 2018

Related U.S. Application Data

(60) Provisional application No. 62/450,858, filed on Jan. 26, 2017.

(51) Int. Cl.
F16L 37/084 (2006.01)
E03F 3/04 (2006.01)
E01C 11/22 (2006.01)
F16L 23/12 (2006.01)

(52) U.S. Cl.
CPC ............ *E03F 3/046* (2013.01); *E01C 11/227* (2013.01); *F16L 23/12* (2013.01); *F16L 37/084* (2013.01)

(58) Field of Classification Search
CPC ......... F16L 23/12; F16L 37/084; F16L 37/26; E03F 3/046
USPC ....................................... 285/27, 29, 67, 325
See application file for complete search history.

(56) References Cited

U.S. PATENT DOCUMENTS

| | | | | |
|---|---|---|---|---|
| 68,650 A | * | 9/1867 | Perkins et al. | .......... F16L 37/26 285/67 |
| 1,739,131 A | * | 12/1929 | Van Ness Eick | ..... F16L 37/252 285/67 |
| 3,225,545 A | * | 12/1965 | Flegel | ................... E01C 11/227 405/43 |
| 4,472,078 A | | 9/1984 | Karbstein | |
| 4,699,544 A | | 10/1987 | Karbstein | |
| 4,767,137 A | * | 8/1988 | Zinner | .................... F16L 23/14 285/325 |
| 5,066,165 A | | 11/1991 | Wofford et al. | |
| 5,281,051 A | | 1/1994 | Stegall | |

(Continued)

OTHER PUBLICATIONS

Examination Report issued by the Patent Office of the Cooperation Council for the Arab States of the Gulf for Application No. 2018-34657 dated Apr. 10, 2020 (3 pages).

*Primary Examiner* — Aaron M Dunwoody
(74) *Attorney, Agent, or Firm* — Michael Best and Friedrich LLP

(57) ABSTRACT

A trench drain connection interface for connecting a first trench drain to a second trench drain. The trench drain connection interface comprises a male end, a female end, and at least one protrusion. The male end of the first trench drain has a flange. The female end of the second trench drain has a flange-receiving recess. The at least one protrusion is on at least one of the male end and the female end. The male end of the first trench drain is configured to engage the female end of the second trench drain and when the male end engages the female end, the at least one protrusion prevents at least a portion of the flange from contacting an inner surface of the flange-receiving recess, thereby providing clearance between the flange and the inner surface of the flange-receiving recess.

20 Claims, 4 Drawing Sheets

(56) References Cited

U.S. PATENT DOCUMENTS

| | | | |
|---|---|---|---|
| 5,718,537 A * | 2/1998 | Becker | E01C 11/227 |
| | | | 404/2 |
| 6,595,720 B2 | 7/2003 | Humphries et al. | |
| 7,252,457 B2 | 8/2007 | Humphries et al. | |
| 7,413,372 B2 | 8/2008 | Meyers | |
| 8,474,068 B2 | 7/2013 | Kik, Sr. et al. | |
| 2003/0147693 A1 | 8/2003 | Knak et al. | |
| 2005/0055887 A1 | 3/2005 | Benesteau et al. | |
| 2009/0050213 A1 * | 2/2009 | Biddell | A61M 39/1011 |
| | | | 137/15.01 |
| 2010/0061805 A1 * | 3/2010 | Nourian | E03F 3/046 |
| | | | 405/36 |
| 2011/0162137 A1 | 7/2011 | Kik, Sr. et al. | |
| 2014/0073232 A1 * | 3/2014 | Karas | B60H 1/00564 |
| | | | 454/143 |
| 2014/0091570 A1 * | 4/2014 | Strutt | F16L 25/0036 |
| | | | 285/325 |
| 2014/0110007 A1 | 4/2014 | Humphries et al. | |
| 2016/0319530 A1 | 11/2016 | Files, Jr. | |
| 2017/0284580 A1 * | 10/2017 | Brown | B01D 17/00 |
| 2018/0030938 A1 * | 2/2018 | Tucker | F16L 23/04 |

* cited by examiner

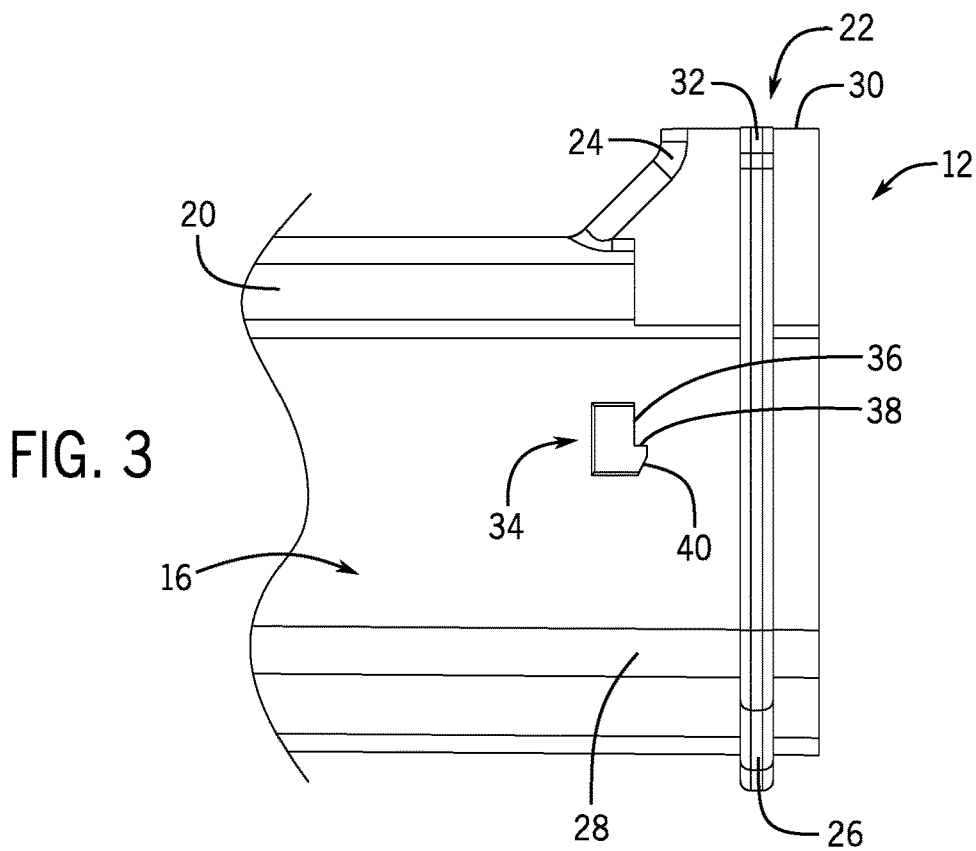
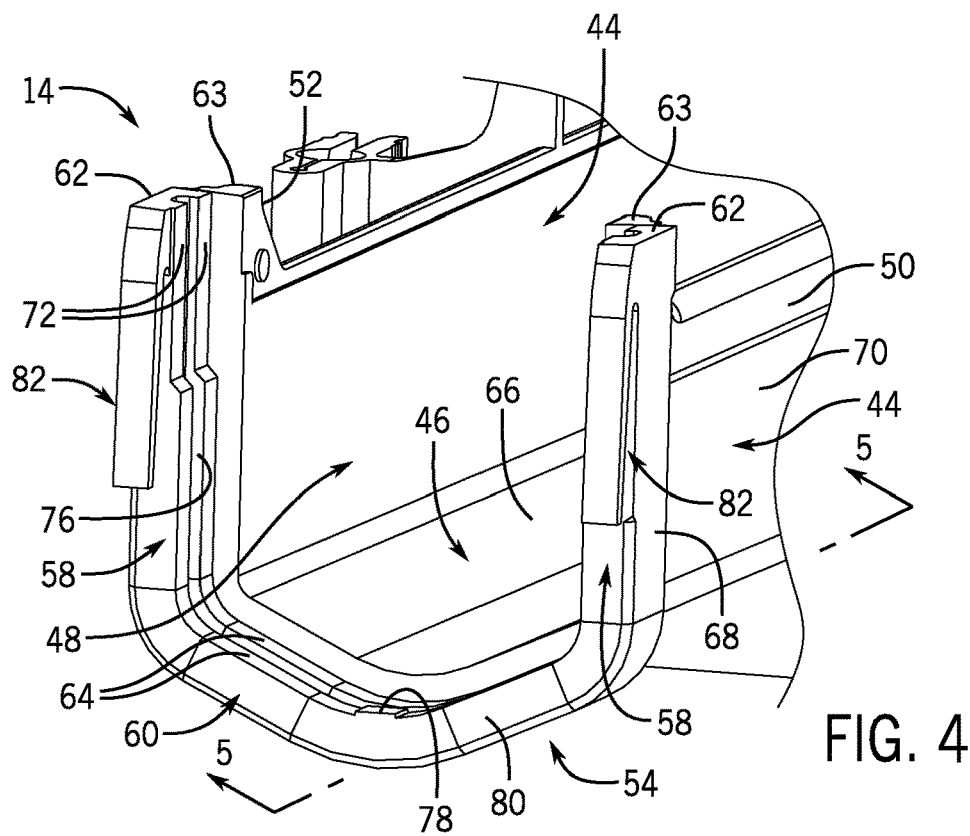

TRENCH DRAIN CONNECTION INTERFACE

CROSS-REFERENCE TO RELATED APPLICATION

This application claims the benefit of U.S. Provisional Patent Application No. 62/450,858 filed on Jan. 26, 2017, which is incorporated by reference herein in its entirety for all purposes.

STATEMENT OF FEDERALLY SPONSORED RESEARCH OR DEVELOPMENT

Not applicable.

TECHNICAL FIELD

This application relates to modular trench drains used to transport liquid to a drainage sewer. More specifically, this application relates to an improved trench drain connection interface and features related thereto.

BACKGROUND

Trench drains are used where extensive amounts of liquid must be moved from one place to another. The trench drains generally transport the liquid to a drainage sewer or some other drainage reservoir. Typically, trench drains are U-shaped or V-shaped troughs and are installed adjacent to either roadways or buildings.

Trench drain systems include several basic designs: concrete, metal and plastic. Generally, concrete trench drain systems use forms. The forms are placed in a ditch dug in the ground. Concrete is then poured around the forms, which are removed after the concrete has set. Trench drain systems made in accordance with this method or similar methods result in relatively expensive systems due to the cost of installing and removing the forms.

Many of the expenses associated with these prior art trench drain systems have been overcome by the advent of polymeric trench drains, which can be left in place after the concrete has been poured in place. These trench drains perform two functions. First, they act as a form for the concrete; and second, they act as a liner. The manufacture and transportation costs with this type of trench drain are significantly less than the other types of trench drains.

However, adjacent segments are often not watertight relative to one another and some amount of liquid seepage could occur through the interface between two segments and this moisture could degrade the quality of the installation with time. Typically, creating a robust connection between adjacent trench drain segments has proven to be challenging task that, in most cases, is not even attempted to be created in a sealed fashion given the difficulties and labor associated with producing the desired result.

SUMMARY

Various improvements to trench drains are described herein including improvements relating to trench drain connection interfaces between various trench drain segments.

According to one aspect, a trench drain connection interface is provided for connecting a first trench drain to a second trench drain. The trench drain connection interface comprises a male end, a female end, and at least one protrusion. The male end of the first trench drain has a flange protruding from and extending along an outwardly-facing wall surface of the first trench drain. The female end of the second trench drain has a flange-receiving recess recessed into and extending along an inwardly-facing wall surface of the second trench drain. The at least one protrusion is on at least one of the male end and the female end. The male end of the first trench drain is configured to engage the female end of the second trench drain. When the male end engages the female end, the at least one protrusion prevents at least a portion of the flange from contacting an inner surface of the flange-receiving recess, thereby providing clearance between the flange and the inner surface of the flange-receiving recess.

In some forms, the clearance provided between the flange and the inner surface of the flange-receiving recess may allow for insertion of a sealant material between the flange and the inner surface of the flange-receiving recess. The flange may extend angularly around the outwardly-facing wall surface and perpendicularly to an axial direction of the first trench drain. The protrusion(s) may comprise flange protrusions disposed on opposing ends of the flange. Similarly, the flange-receiving recess may extend angularly around the inwardly-facing wall surface and perpendicularly to an axial direction of the second trench drain. The protrusion(s) may comprise a female end protrusion disposed adjacent the flange-receiving recess on the female end.

In some forms, the trench drain connection interface may further include a locking mechanism disposed on at least one of the male end and the female end. When the male end engages the female end, the locking mechanism may be configured to selectively lock the male end in engagement with the female end. The locking mechanism may comprise a locking arm and a locking lip. The locking arm may be disposed on one of the male end and the female end and the locking lip may be disposed on a different one of the male end and the female end than the locking arm. When the male end engages the female end, the locking arm may be biased toward engagement with the locking lip and, at least temporarily prevent the first and second trench drains from being separated from one another. It is contemplated that, the locking arm may be elastically deformable between a locked position and an un-locked position and in which the locking arm is biased towards the locked position. When the locking arm engages the locking lip, the male end may be locked into reversible engagement with the female end. When the male end is engaged with the female end, the locking arm is configured to be selectively disengaged from the locking lip by elastically flexing the locking arm to the un-locked position, thereby selectively unlocking the male end from engagement with the female end and for the segments of the trench drain to be separated from one another.

In accordance with another aspect, a trench drain connection interface is provided for connecting a first trench drain to a second trench drain. The trench drain connection interface comprises a male end, a female end, and a locking mechanism. The male end of the first trench drain has a flange protruding from and extending along an outwardly-facing wall surface of the first trench drain. The female end of the second trench drain has a flange-receiving recess recessed into and extending along an inwardly-facing wall surface of the second trench drain. The locking mechanism is disposed on at least one of the male end and the female end. The male end of the first trench drain is configured to engage (in some instances, reversibly) the female end of the second trench drain. When the male end engages the female end, the locking mechanism is configured to selectively lock the male end in engagement with the female end.

In some forms, the trench drain connection interface may further include one or more protrusions on the male end and/or the female end. When the male end engages the female end, the protrusion(s) may prevent at least a portion of the flange from contacting an inner surface of the flange-receiving recess, thereby providing clearance between the flange and the inner surface of the flange-receiving recess. The clearance provided between the flange and the inner surface of the flange-receiving recess may allow for insertion of a sealant material between the flange and the inner surface of the flange-receiving recess.

In some forms, the locking mechanism may include a locking arm and a locking lip. The locking arm may be disposed on one of the male end and the female end and the locking lip may be disposed on a different one of the male end and the female end than the locking arm. When the male end engages the female end, the locking arm may be biased toward engagement with the locking lip. When the locking arm engages the locking lip, the male end may be locked in engagement with the female end. The locking arm may be elastically deformable between a locked position and an un-locked position. The locking arm may be biased towards the locked position (e.g., in an un-deformed state, the arm may be in the locked position). When the male end is engaged with the female end, the locking arm may be configured to be selectively disengaged from the locking lip, thereby selectively unlocking the male end from engagement with the female end.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE FIGURES

FIG. 3 is a side elevational view of the male end shown in FIG. 2;

FIG. 4 is a top perspective view of a female end of a trench drain of the trench drain connection interface shown in FIG. 1 apart from the male end;

DETAILED DESCRIPTION

FIGS. 1 through 7 show a trench drain connection interface 10 for connecting a first trench drain 12 to a second trench drain 14. In some forms, the first trench drain 12 and the second trench drain 14 are made of a polymeric or plastic material, such as a resin containing fiberglass, nylon, or a polyethylene and are formed in lengths of approximately eighty inches per trench drain segment.

Figure 2:
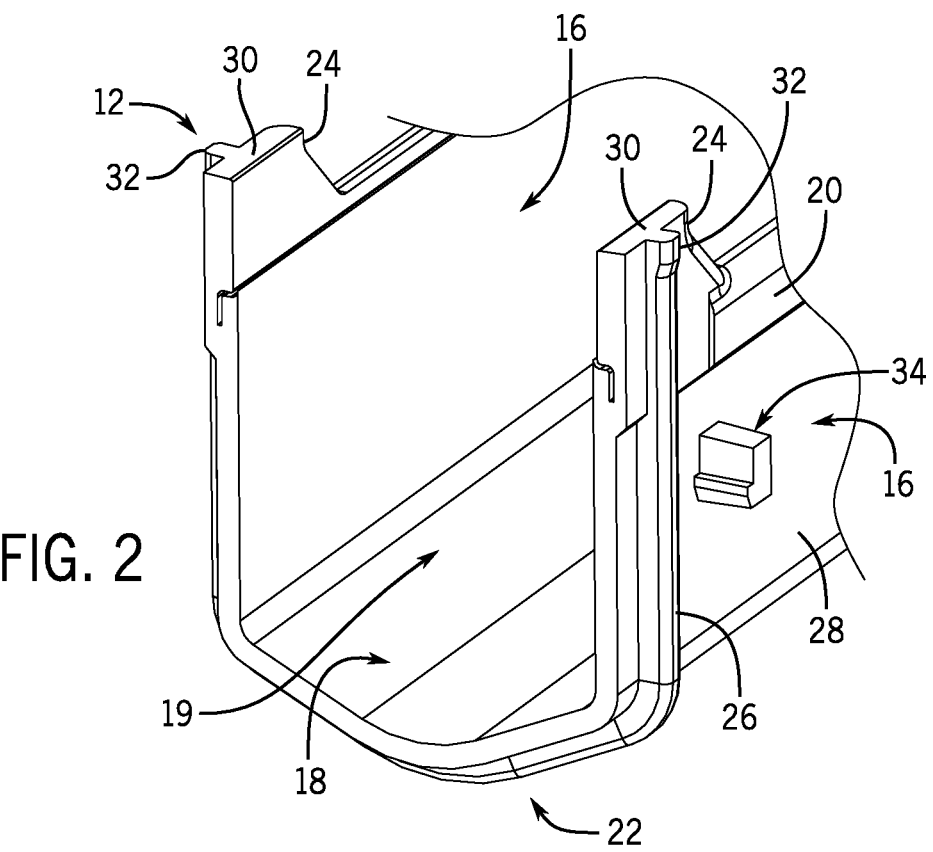
FIG. 2 is a top perspective view of a male end of a trench drain of the trench drain connection interface shown in FIG. 1 apart from the female end.

Referring now to FIGS. 2 and 3, an end of the first trench drain 12 is shown apart from the second trench drain 14. The first trench drain 12 includes a pair of spaced apart sidewalls 16 connected to a bottom wall 18 to form a U-shape defining an open-faced channel 19. The sidewalls 16 can either be straight or angled. Likewise, the bottom wall 18 can either be flat, round, or angled so that water or other liquids can be directed from one end to another. In any event, the particular geometry of the first trench drain 12 can deviate from that specifically illustrated in the exemplary embodiment. Additionally, each of the sidewalls 16 has an upper portion 20 that protrudes outwardly, increasing the thickness of the corresponding sidewall 16 within the upper portion 20.

The illustrated end of the first trench drain 12 further illustrates a male end 22 of the first trench drain 12. The male end 22 includes extensions 24 extending substantially vertically from the upper portion 20 of each sidewall 16. The male end 22 also notably includes a flange 26 protruding from and extending along an outwardly-facing wall surface 28 of the first trench drain 12 from an upper surface 30 of one extension 24 on one sidewall 16, around the bottom wall 18, to the upper surface 30 of the opposing extension 24 on the opposing sidewall 16. Said differently, the flange 26 extends angularly around the outwardly-facing wall surface 28 and perpendicularly away from the walls on which it is disposed in an axial direction.

In the particular embodiment illustrated, the flange 26 further includes flange protrusions 32 which are disposed at opposing ends of the flange 26, adjacent the upper surface 30 of each sidewall 16. The flange protrusions 32 protrude from the flange 26 still further away from the corresponding sidewall 16.

As best illustrated in FIG. 3, the male end 22 additionally includes locking lips 34 disposed on each sidewall 16 between the upper portion 20 of each sidewall 16 and the bottom wall 18. Each locking lip 34 includes a vertical engagement surface a horizontal engagement surface 38, and a compression surface 40. The locking lip 34 is configured to engage a locking arm 82 (shown in FIGS. 4 and 5) of the second trench drain 14 to lock the two segments of the trench together, as will be discussed in greater detail below.

Figure 5:
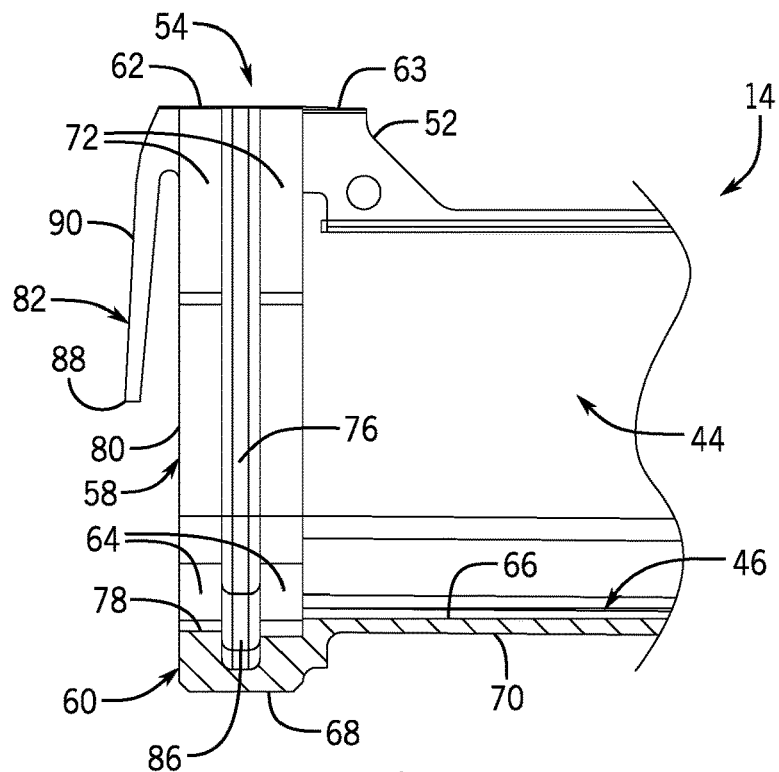
FIG. 5 is a cross-sectional side view of the female end of FIG. 4, taken along line 5-5 of FIG. 4.

Referring now to FIGS. 4 and 5, the second trench drain 14 similarly includes a pair of spaced apart sidewalls 44 connected to a U-shaped bottom wall 46, defining an open-faced channel 48. As with the first trench drain 12, the particular geometry of the second trench drain 14 can deviate from that illustrated.

Each of the sidewalls 44 again includes an upper portion 50 that protrudes outwardly, increasing the thickness of the corresponding sidewall 44 within the upper portion 50.

Figure 1:
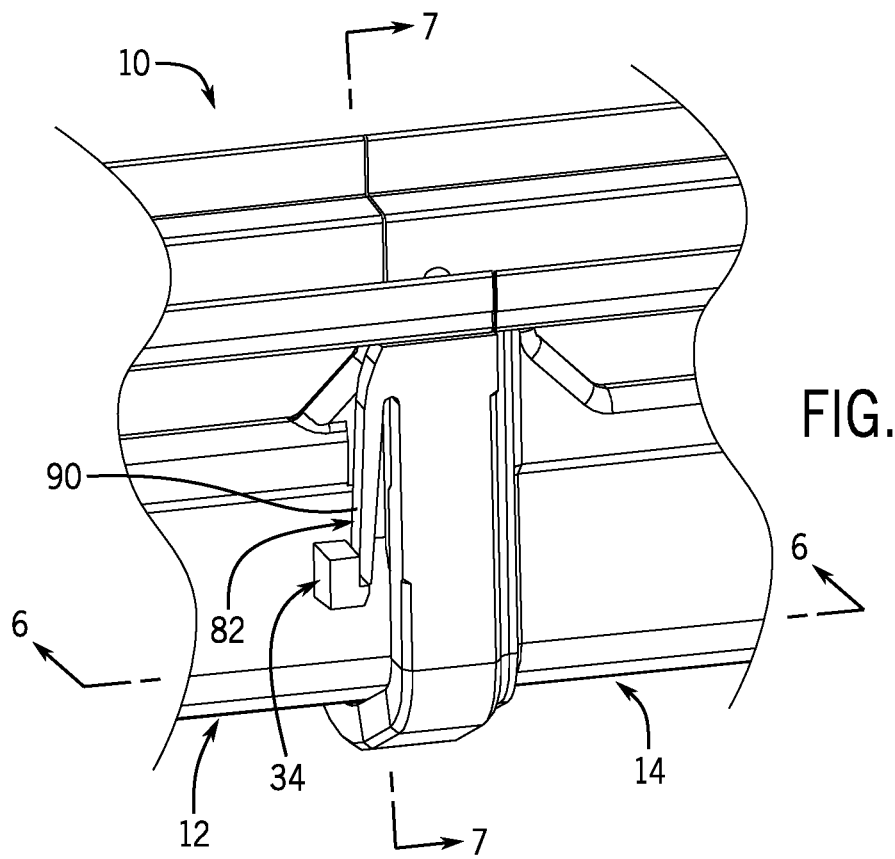
FIG. 1 is a top perspective view of a trench drain connection interface between two assembled segments of the trench drain.

The second trench drain 14 also includes extensions 52 extending substantially vertically from the upper portion 50 of each sidewall 44. The extensions 52 are further disposed adjacent to a female end 54 of the second trench drain 14, with the female end 54 being configured to receive the male end 22 of the first trench drain 12 as shown in the assembly of FIG. 1.

The female end 54 includes sidewall portions 58 and a bottom wall portion 60. The sidewall portions 58 are each disposed adjacent to a corresponding one of the sidewalls 44, with upper surfaces 62 of the sidewall portions 58 being flush with upper surfaces 63 of the extensions 52. Similarly, the bottom wall portion 60 is disposed adjacent to the bottom wall 46.

Each of the sidewall portions 58 are offset from the corresponding sidewalls 44 and the bottom wall portion 60 is offset from the bottom wall 46. The various portions 58, 60 are offset from their corresponding walls 44, 46 such that an inwardly-facing wall surface 64 of the female end 54 is recessed with respect to an inwardly-facing wall surface 66 of the open-faced channel 48 and an outwardly-facing wall surface 68 of the female end 54 correspondingly protrudes from an outwardly-facing wall surface 70 of the open-faced channel 48.

The inwardly-facing wall surface 64 of the female end 54 includes recessed surfaces 72 and a flange-receiving recess 76. The recessed surfaces 72 are recessed into opposing ends of the inwardly-facing wall surface 64 and extend through the upper surfaces 62 of the sidewall portions 58. The flange-receiving recess 76 is recessed more deeply into the inwardly-facing wall surface 64 than the recessed surfaces 72, and effectively bisects the inwardly-facing wall surface 64. Said differently, the flange-receiving recess 76 extends angularly around the inwardly-facing wall surface 64 and perpendicularly to an axial direction of the second trench drain 14, also extending along the recessed surfaces 72 and through the upper surfaces 62 of each sidewall portion 58.

Additionally, in the illustrated embodiment, the inwardly-facing wall surface 64 further includes a female-end protrusion 78. The female-end protrusion 78 is disposed centrally on the bottom wall portion 60 on the inwardly-facing wall surface 64 between the flange-receiving recess 76 and an axial end surface 80 of the female end 54

The female end 54 also includes the locking arms 82 for engagement with the locking lip 34. Each of the locking arms 82 extends from the end surface 80, adjacent to the upper surface 62 of the corresponding sidewall portion 58. Each of the locking arms 82 further extends away from the end surface 80 in a generally downward direction that is slightly angular away from the axial end of the segment, although it is also generally in the plane of the corresponding sidewall 44.

Now that the structure of the first trench drain 12 and the second trench drain 14 have been described above, an exemplary method of installing the first trench drain 12 together with the second trench drain 14, thereby forming the trench drain connection interface 10, will be described below. It will be understood that the following description is given as an example, and is not meant to be limiting.

Figure 6:
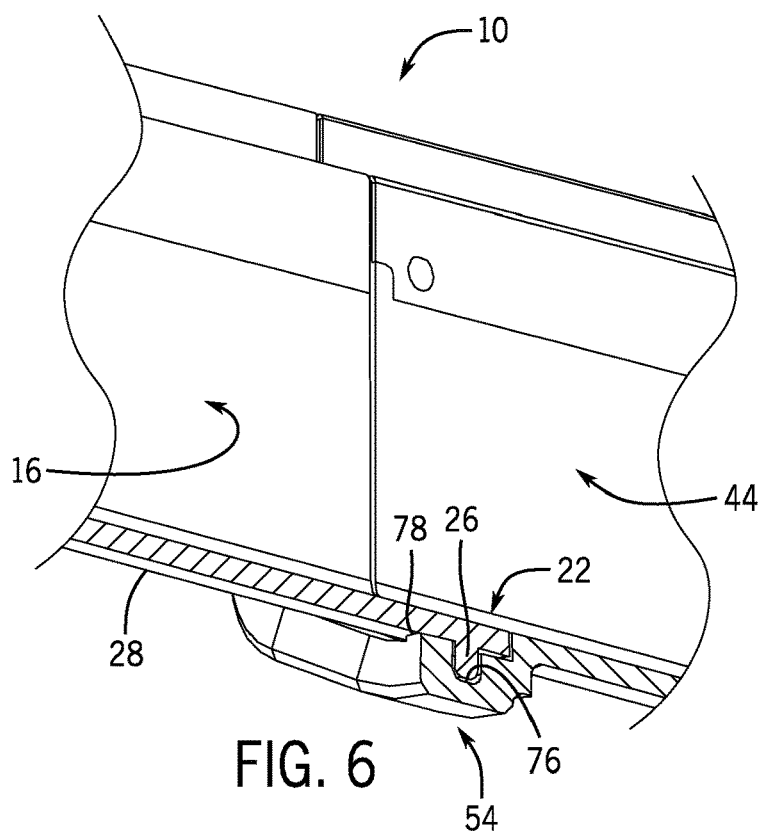
FIG. 6 is a side cross-sectional view of the trench drain connection interface of FIG. 1, taken along line 6-6 of FIG. 1.
Figure 7:
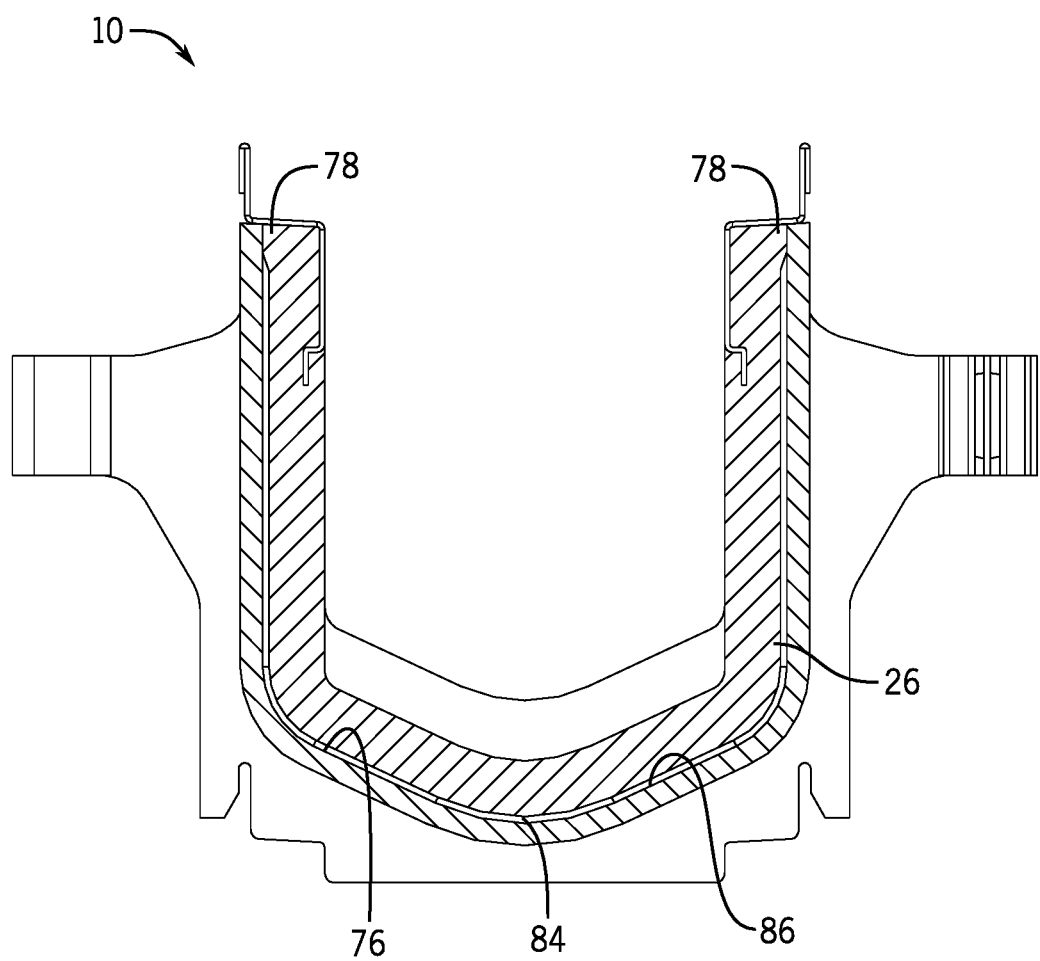
FIG. 7 is an axial cross-sectional view of the trench drain connection interface of FIG. 1, taken along line 7-7 of FIG. 1.

The trench drain connection interface 10 is formed by engaging the male end 22 of the first trench drain 12 with the female end 54 of the second trench drain 14 (as shown in FIGS. 1, 6, and 7). The male end 22 engages the female end 54 by inserting the flange 26 of the male end 22 into the flange-receiving recess 76 of the female end 54. When inserting the flange 26 into the flange-receiving recess 76, the male end 22 of the first trench drain 12 is placed above the female end 54 of the second trench drain 14, with the outwardly-facing wall surface 28 of the first trench drain 12 facing the inwardly-facing wall surface 64 of the female end 54 and the flange 26 placed directly above the flange-receiving recess 76.

With the flange 26 above the flange-receiving recess 76, the first trench drain 12 and the second trench drain 14 are situated such that a flange plane, defined by the flange 26, and a flange-receiving plane, defined by the flange-receiving recess 76, are coplanar. With the flange plane and the flange-receiving plane coplanar, the flange-receiving recess 76 is configured to receive the flange 26 of the male end 22 by sliding the flange 26 downwards into the flange-receiving recess 76. As the flange 26 is slid into the flange-receiving recess 76, the recessed surfaces 72 of the female end 54 provide clearance for the upper portions 20 of the first trench drain 12, such that the upper portions 20 do not contact the upper surfaces 62 of the sidewall portions 58. The flange 26 is then slid into the flange-receiving recess 76 until the outwardly-facing wall surface 28 of the first trench drain 12 contacts the female-end protrusion 78 (as shown in FIG. 6).

As best shown in FIG. 7, when the flange 26 is fully inserted into the flange-receiving recess 76, the female-end protrusion 78 can cause a gap 84 to remain between a portion of the flange 26 and an inner surface 86 of the flange-receiving recess 76. This gap 84 provides clearance between the flange 26 and the flange-receiving recess 76, thereby allowing for the insertion of a sealant material between the flange 26 and the flange-receiving recess 76. Additionally, as illustrated, each of the flange protrusions 32 contact the inner surface 86 of the flange-receiving recess 76 at opposing upper ends of the flange-receiving recess 76, which aids in keeping the flange 26 centered within the flange-receiving recess 76. It is noted that these protrusions for creating separation could be differently positioned across the two halves of the assembly or even on the different parts to achieve a similar effect.

As best shown in FIGS. 1, 3, and 5, when the male end 22 engages the female end 54, the locking arm 42 of the female end 54 also engages the locking lip 34 of the male end 22 causing the arm 42 to temporarily flex and elastically deform against the compression surface 40 of the lip 34. When the locking arm 42 fully engages the locking lip 34, the arm 42 flexes or snaps back to a non-deformed state or less-deformed state (as there still may be some induced flexure of the arm 42) and the male end 22 is locked in engagement with the female end 54, preventing withdrawal of the sections from one another.

In the locked position, a tip 88 (best shown in FIG. 5) of the locking arm 42 is disposed vertically above the horizontal engagement surface 38 of the locking lip 34. As such, if the male end 22 is slid upwards, the tip 88 of the locking arm 42 contacts the horizontal engagement surface 38, beyond which it cannot pass in the un-flexed state, preventing the male end 22 from being removed from the female end 54. Additionally, because the locking arm 42 is angled slightly away from the corresponding end surface 80, it is also angled slightly towards the vertical engagement surface 36 of the locking lip 34 which may push the segments apart from one another axially to some degree (although because of the flange-recess interaction, they will not separate).

To move the locking arm 42 from the locked position to the unlocked position, the locking arm 42 may pushed towards the corresponding end surface 80, such that the tip 88 of the locking arm 42 is no longer disposed vertically above the horizontal engagement surface 38 of the locking lip 34. In this case, if the male end 22 is slid upwards, the tip 88 does not contact any surface of the locking lip 34, and so the male end 22 may permitted to slide upward and out of engagement with the female end 54. As such, the locking arm 42 can be selectively disengaged from the locking lip 34, thereby unlocking the male end 22 from engagement with the female end 54.

Additionally, when the male end 22 is slid downward into engagement with the female end 54, the compression surface 40 of the locking lip 34 contacts an outer surface 90 (shown in FIG. 5) of the locking arm 42. As the male end 22 is slid downward, the compression surface 40 compresses the locking arm 42 toward the corresponding sidewall portion 58. Once the tip 88 of the locking arm 42 passes the horizontal engagement surface 38 of the locking lip 34, the elasticity of the locking arm 42 biases the locking arm 42 towards the locked position, and the locking arm 42 swings outward, thereby locking the male end 22 into engagement with the female end 54.

It will be appreciated that, while two segments of trench drain 12 and 14 are illustrated, that these segments may be different ends of a single identical segment design. Put differently, trench drain segments may be produced having male and female end sections such chat segments may be strung together in connection. Still yet, it is contemplated that segments of trench drain could be fabricated having male-male ends or female-female ends.

Further still, it should be appreciated that while both a flange-recess interlock design and a reversible snapping connection design are illustrated in combination, that these designs and structures might be separately used. For example, the flange-recess interlock design could be employed without the interlock shown. Similarly, an interlock could be employed in other types of suitable trench drain connections. Nonetheless, certain advantages may flow from their use in combination. For example, the flange-recess connection can be easily maintained once established by the interlock. Still yet, if the interlock causes the parts be urged axially away from one another, a side surface of the flange might be drawn into engagement with the side surface of the corresponding recess, creating a predictable plane or surface of engagement between the two segments.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A trench drain connection interface for connecting a first trench drain to a second trench drain, the trench drain connection interface comprising:
   a male end of the first trench drain having a flange protruding from and extending along an outwardly-facing wall surface of the first trench drain, wherein the first trench drain has a first base wall and a first opening opposite the first base wall, wherein the flange extends angularly around the outwardly-facing wall surface and perpendicularly to an axial direction of the first trench drain;
   a female end of the second trench drain having a flange-receiving recess recessed into and extending along an inwardly-facing wall surface of the second trench drain, wherein the second trench drain has a second base wall and second opening opposite the second base wall;
   at least one protrusion on at least one of the male end and the female end; and
   wherein the male end of the first trench drain is configured to engage the female end of the second trench drain, and wherein the at least one protrusion is positioned between the flange and the recess and prevents at least a portion of the flange from contacting an inner surface of the flange-receiving recess, thereby providing clearance between the flange and the inner surface of the flange-receiving recess, and wherein the clearance provided between the flange and the inner surface of the flange-receiving recess allows for insertion of a sealant material between the flange and the inner surface of the flange-receiving recess.

2. The trench drain connection interface of claim 1, wherein the at least one protrusion comprises flange protrusions disposed on opposing ends of the flange.

3. The trench drain connection interface of claim 1, wherein the flange-receiving recess extends angularly around the inwardly-facing wall surface and perpendicularly to an axial direction of the second trench drain.

4. The trench drain connection interface of claim 1, wherein the at least one protrusion comprises a female end protrusion disposed adjacent the flange-receiving recess on the female end.

5. The trench drain connection interface of claim 1, further including a locking mechanism disposed on at least one of the male end and the female end.

6. The trench drain connection interface of claim 5, wherein the locking mechanism is configured to selectively lock the male end in engagement with the female end.

7. The trench drain connection interface of claim 5, wherein the locking mechanism comprises a locking arm and a locking lip, the locking arm being disposed on one of the male end and the female end and the locking lip being disposed on a different one of the male end and the female end than the locking arm.

8. The trench drain connection interface of claim 7, wherein the locking arm is biased toward engagement with the locking lip.

9. The trench drain connection interface of claim 8, wherein the locking arm is elastically deformable between a locked position and an un-locked position and in which the locking arm is biased towards the locked position.

10. The trench drain connection interface of claim 9, wherein the male end is locked in engagement with the female end.

11. The trench drain connection interface of claim 10, wherein the locking arm is configured to be selectively disengaged from the locking lip by elastically deforming the locking arm to the unlocked position, thereby selectively unlocking the male end from engagement with the female end.

12. The trench drain connection interface of claim 1, wherein the first trench drain and the second trench drain both define a passageway, wherein the clearance includes a volume, and wherein the volume does not extend completely around the passageway.

13. The trench drain connection interface of claim 1, wherein the at least one protrusion prevents the flange from contacting the inner surface of the flange-receiving recess.

14. A trench drain connection interface for connecting a first trench drain to a second trench drain, the trench drain connection interface comprising:
   a male end of the first trench drain having a flange protruding from and extending along an outwardly-facing wall surface of the first trench drain, wherein the first trench drain has a first base wall and a first opening opposite the first base wall, and wherein the first trench drain defines a first axis;
   a female end of the second trench drain having a flange-receiving recess recessed into and extending along an inwardly-facing wall surface of the second trench drain, wherein the second trench drain has a second base wall and a second opening opposite the second base wall;
   a locking mechanism disposed on at least one of the male end and the female end; and
   wherein the male end of the first trench drain is configured to engage the female end of the second trench drain, when the male end engages the female end, the locking mechanism is configured to selectively lock the male end in engagement with the female end, and wherein the locking mechanism is configured to bias the first trench drain away from the second trench drain along the first axis.

15. The trench drain connection interface of claim 14, further comprising at least one protrusion on at least one of the male end and the female end and when the male end engages the female end, the at least one protrusion prevents at least a portion of the flange from contacting an inner surface of the flange-receiving recess, thereby providing clearance between the flange and the inner surface of the flange-receiving recess.

16. The trench drain connection interface of claim 15, wherein the clearance provided between the flange and the inner surface of the flange-receiving recess allows for insertion of a sealant material between the flange and the inner surface of the flange-receiving recess.

17. The trench drain connection interface of claim 14, wherein the locking mechanism comprises a locking arm and a locking lip, the locking arm being disposed on one of the male end and the female end and the locking lip being disposed on a different one of the male end and the female end than the locking arm.

18. The trench drain connection interface of claim 17, wherein the locking arm is biased toward engagement with the locking lip and, when the locking arm engages the locking lip, the male end is locked in engagement with the female end.

19. The trench drain connection interface of claim 18, wherein the locking arm is elastically deformable between a locked position and an un-locked position, the locking arm being biased towards the locked position.

20. The trench drain connection interface of claim 19, wherein the locking arm is configured to be selectively disengaged from the locking lip by elastically deforming the locking arm to the unlocked position, thereby selectively unlocking the male end from engagement with the female end.

* * * * *